United States Patent
Groh et al.

(10) Patent No.: US 10,592,805 B2
(45) Date of Patent: Mar. 17, 2020

(54) PHYSICS MODELING FOR RADAR AND ULTRASONIC SENSORS

(71) Applicant: Ford Global Technologies, LLC, Dearborn, MI (US)

(72) Inventors: Alexander Groh, Detroit, MI (US); Kay Kunes, Maranz, AZ (US); Sarah Houts, Mountain View, CA (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 757 days.

(21) Appl. No.: 15/248,787

(22) Filed: Aug. 26, 2016

(65) Prior Publication Data
US 2018/0060725 A1    Mar. 1, 2018

(51) Int. Cl.
| | |
|---|---|
| G06N 3/08 | (2006.01) |
| G06N 3/04 | (2006.01) |
| G09B 9/54 | (2006.01) |
| G06F 17/50 | (2006.01) |
| G06N 7/00 | (2006.01) |

(52) U.S. Cl.
CPC .......... *G06N 3/08* (2013.01); *G06F 17/5009* (2013.01); *G06F 17/5095* (2013.01); *G06N 3/04* (2013.01); *G06N 3/0454* (2013.01); *G06N 7/005* (2013.01); *G09B 9/54* (2013.01); *G06F 2217/10* (2013.01)

(58) Field of Classification Search
CPC .......... G06N 3/08; G06N 3/04; G06N 3/0454; G06N 7/005; G06F 17/5009
See application file for complete search history.

(56) References Cited

U.S. PATENT DOCUMENTS

| | | |
|---|---|---|
| 7,899,616 B2 | 3/2011 | Breed |
| 8,364,334 B2 | 1/2013 | Au |
| 8,849,494 B1 | 9/2014 | Herbach |
| 9,008,998 B2 | 4/2015 | Canter |
| 9,097,800 B1 | 8/2015 | Zhu |

(Continued)

OTHER PUBLICATIONS

Reina, Giulio et al.. "Self-learning classification of radar features for scene understanding." Robotics and Autonomous Systems 60.11 (2012): 1377-1388.

*Primary Examiner* — Austin Hicks
(74) *Attorney, Agent, or Firm* — David R. Stevens; Stevens Law Group

(57) ABSTRACT

A machine learning module may generate a probability distribution from training data including labeled modeling data correlated with reflection data. Modeling data may include data from a LIDAR system, camera, and/or a GPS for a target environment/object. Reflection data may be collected from the same environment/object by a radar and/or an ultrasonic system. The probability distribution may assign reflection coefficients for radar and/or ultrasonic systems conditioned on values for modeling data. A mapping module may create a reflection model to overlay a virtual environment assembled from a second set of modeling data by applying the second set to the probability distribution to assign reflection values to surfaces within the virtual environment. Additionally, a test bench may evaluate an algorithm, for processing reflection data to generate control signals to an autonomous vehicle, with simulated reflection data from a virtual sensor engaging reflection values assigned within the virtual environment.

17 Claims, 8 Drawing Sheets

(56) References Cited

U.S. PATENT DOCUMENTS

| | | |
|---|---|---|
| 9,097,804 B1 | 8/2015 | Silver |
| 9,286,524 B1* | 3/2016 | Mei .................. G06K 9/6273 |
| 2012/0127016 A1* | 5/2012 | Watanabe ............... G01S 7/412 |
| | | 342/70 |
| 2014/0035775 A1 | 2/2014 | Zeng |
| 2014/0122409 A1* | 5/2014 | Na ....................... G06N 20/00 |
| | | 706/52 |
| 2015/0266455 A1* | 9/2015 | Wilson ................... G09B 19/10 |
| | | 701/93 |

* cited by examiner

PHYSICS MODELING FOR RADAR AND ULTRASONIC SENSORS

FIELD OF THE INVENTION

This invention relates to simulation environments and, more particularly, to the enhancement of simulation environments to simulate reflections from surfaces in therein for virtual radar systems and/or virtual ultrasonic systems.

BACKGROUND OF THE INVENTION

Assisted driving and autonomous driving technologies rely on control signals provided to vehicles by algorithms that process data collected by a variety of different sensors carried by those vehicles. Many of these algorithms, such as computer vision and sensor fusion algorithms, are developed by machine learning. Development of algorithms by machine learning requires large amounts of ground truth data for training and evaluation.

Sensors can be used to collect data, which may then be used to synthetically generate environments simulating the environments from which the sensors collect the data. The simulated environments can provide accurate datasets with which to develop algorithms for autonomous or assisted driving by machine learning. However, there presently are no methods for providing simulated environments that can provide datasets that can train and/or evaluate algorithms that would make use of radar systems and/or ultrasonic systems.

BRIEF DESCRIPTION OF THE DRAWINGS

In order that the advantages of the disclosures will be readily understood, a more particular description will be rendered by reference to specific embodiments illustrated in the appended drawings, under the understanding that these drawings depict only typical examples and are not to be considered limiting in scope.

DETAILED DESCRIPTION

It will be understood that components of the invention, as generally described and illustrated herein, can be arranged in a wide variety of different configurations. The following detailed description, which merely represents certain examples, is not intended to limit the scope of the claims. These examples may be understood by reference numbers to the figures. Numbers concluding with a letter, or letter-number pair, indicate differing instances of a class with the same or similar attributes. References by number refer more generally to the class and/or a representative instance.

Figure 1:
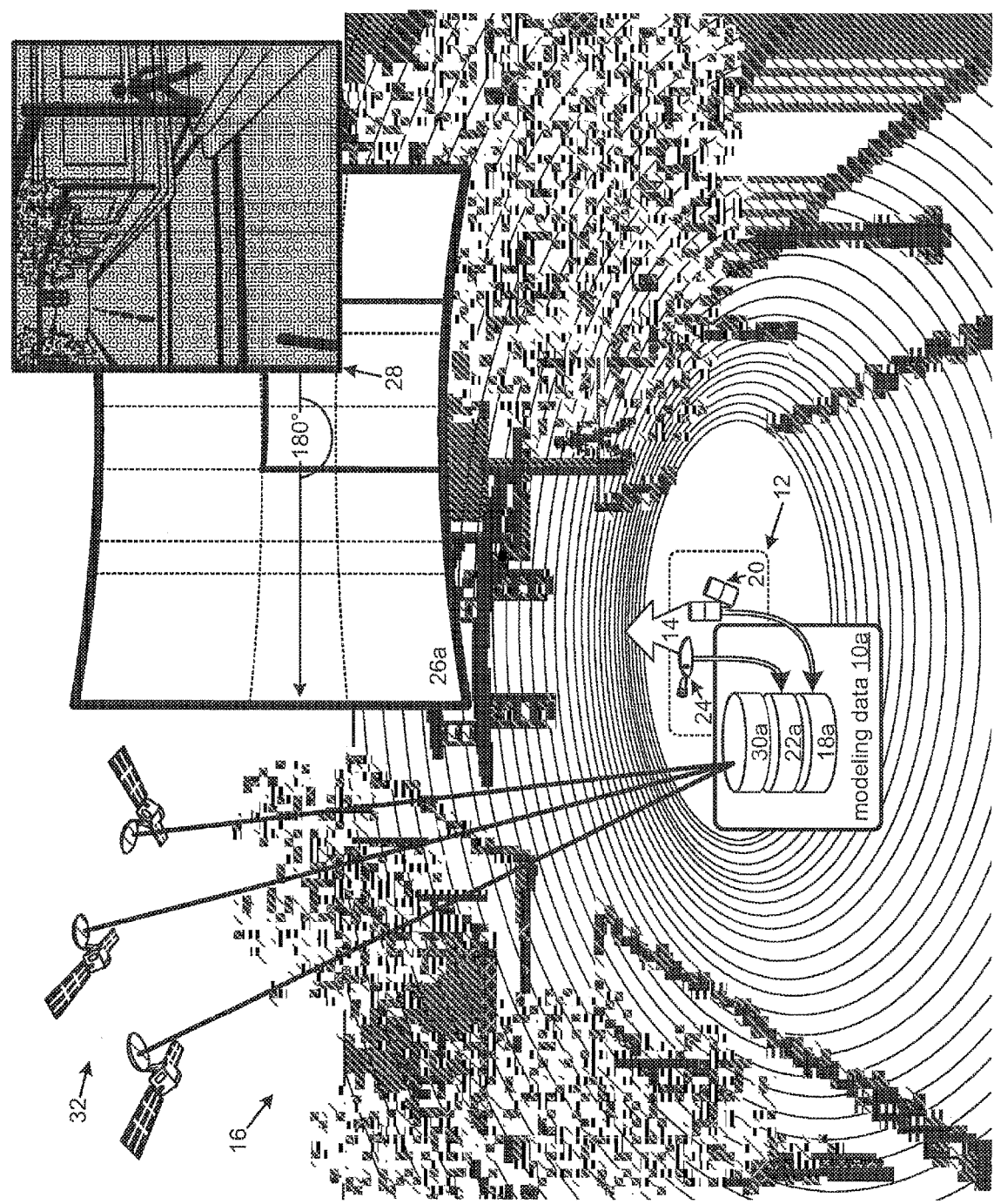
FIG. 1 is a depiction of various datasets, which may be collected and used to generate high-resolution, three-dimensional models of driving environments, in accordance with examples.

Referring to FIG. 1, a collection of modeling data 10a is depicted. The modeling data 10a may include different data types that may be assembled to simulate the environment from which the modeling data 10a is collected. The modeling data 10a may be collected by a set of sensors 12 traversing 14 an environment 16 typical of an environment in which an autonomous and/or assisted driving vehicle may be utilized.

The different types of data collected by the set of sensors 12 may be stored in different databases, or datasets. For example, a first dataset 18a may store sensor data collected from a LIght-Detection-And-Ranging (LIDAR) system 20. In FIG. 1, the concentric circles emanating from the LIDAR sensor 20 together with their reflections, represent such LIDAR data, as they might appear in a three-dimensional rendering of the first dataset 18a. The spatial relationships between objects in the environment 16 from which the modeling data 10a are collected, such as the intersection, curbs, trees, buildings, traffic lights, and pedestrian may be recognized in the rendering.

A second dataset 22a, which may be correlated to the first dataset 18a, may be collected by a camera system 24. The camera data is represented by the field of view 26a of the camera system 24 with an image portion 28 thereof. The image 28 depicts the same features.

As the set of sensors 12 traverses the 16 environment, the set of sensors 12 collect data from different geophysical locations and/or orientations relative to objects in the environment 16. In some examples, the creation of a three-dimensional virtual environment, or simulation environment, may be assisted by the collection of a third dataset 30a, which may be correlated to the first dataset 18a and/or the second dataset 22a. The third dataset 30a may include information about the location, position, and/or orientation of the set of sensors 12. Without limitation, the third dataset 30a may store data from a Global Positioning System (GPS), as represented by the group of satellites 32. Data from the third dataset 30a may assist to stitch together camera data and/or LIDAR data from, respectively, the first dataset 18a and/or the second dataset 22a.

The third dataset 30a may include other forms of location, position, and/or orientation information. In some examples, the collection of modeling data 10 may be provided without a first dataset 18a and/or second dataset 22a. Often, mapping and/or survey companies gather modeling data 10 for various roads and/or environments that can be assembled to create three-dimensional simulation environments.

Subsequent datasets derived for algorithm development from such three-dimensional simulation environments may embed information about, for example and without limitation, depth, optical flow, and/or object segmentation, useful to the development, testing, and evaluation of algorithms for autonomous or assisted driving. However, such three-dimensional simulation environments do not provide information that would allow the development, testing, and evaluation of algorithms that leverage data collected from certain important sensors often carried by autonomous and/or assisted driving vehicles. Three-dimensional simulation environments require enhancements to provide this information.

Figure 2:
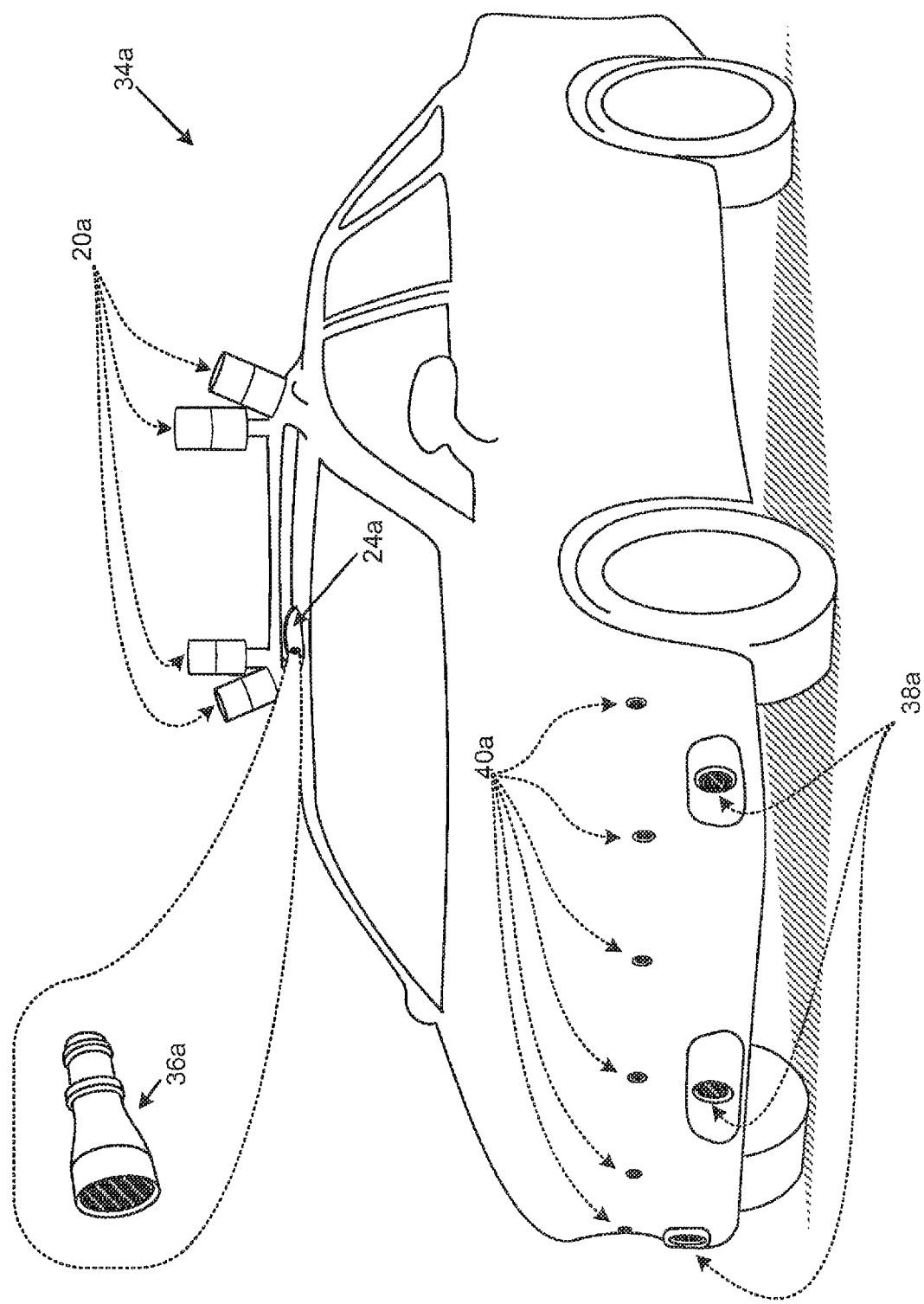
FIG. 2 is a depiction of an automobile equipped with sensors used in assisted and/or autonomous driving, in accordance with examples.

Referring to FIG. 2, an automobile 34a is depicted. However, these disclosures may also apply to other vehicles 34. The vehicle 34a may be equipped with various sensors for recording signals reflecting from various objects that may be relevant to driving the vehicle 34a. Non-limiting examples may include a LIDAR system 20a, a camera system 24a, a radar system 38a and/or the SOund NAvigation and Ranging (SONAR) system 40a, also referred to as an ultrasonic system.

The LIDAR system 20a may provide a laser-based, three-dimensional scanning system for highly accurate distance measurements. To determine distances, the LIDAR 20a may send out, from each of the four units depicted, pulses of invisible laser light at wavelengths around, without limitation, 900 nm to 1000 nm. The pulses may originate from a group of lasers at each unit. Each unit may then detect reflections from the pulses hundreds of thousands of time per second. Each unit may continuously spins atop the vehicle 34a at rates of, by way of example and not limitation, 300 to 900 revolutions per minute. Distances measured by the LIDAR system 20a, may be registered with pixels from the camera 24 and can be combined to create a three-dimensional model of the environment 16.

Although a single camera 24a is depicted, any number of cameras 24 may capture images of oncoming road-scenes. Where multiple cameras 24 are used, stereoscopic information may be acquired, from which distances may also be determined. Furthermore, the camera(s) 24a may capture images at a frame rate that may exceed fourteen frames per second. Additionally, the camera(s) 24a may be responsive to different wavelengths, both inside and outside the visible range, and/or may capture color information. As depicted in the exploded view, the camera 24a may be provided with an optical system 36a controlling focus, field of view, magnification, and/or similar parameters. Images captured by such cameras 24 may be analyzed to classify, detect, and/or locate depicted objects and/or surfaces that are relevant to assisted and autonomous driving systems.

The radar system 38a may operate at frequencies of around 79 Gigahertz, 24 Gigahertz, 76 Gigahertz, and/or somewhere between 77 Gigahertz and 81 Gigahertz. Other frequencies are also possible. To provide range resolution, the radar systems 38a may rely on Frequency Modulated-Continuous Wave (FMCW) transmissions over bandwidths such as, without limitation, between 200 Megahertz and 5 Gigahertz. Furthermore, the radar system 38a may transmit at different beam widths for long, medium, and/or short detection ranges and/or may include different elements for different front, side, blind spot, and/or rear beams. Such different beams may be transmitted at the same and/or different frequencies and/or over the same and/or different bandwidths.

The ultrasonic system 40a may transmit pressure waves of sound energy at frequencies, by way of example and not limitation, between 25 and 50 Kilohertz. As with the radar system 38a, the ultrasonic system 40a, may include different elements for different front, side, blind spot, and/or rear beams.

In conditions of low light, even with the mitigating influence of headlights, the usefulness of the camera system 24a is reduced. Although darkness does not affect the LIDAR system 20a, other conditions that decrease the utility of the camera system 24a, such as fog, snow, heavy rain, and/or other weather conditions, can also compromise the data from the LIDAR system 20a. In such situations, the importance of other sensors increases and can even become paramount. Furthermore, even in situations where the LIDAR system 20a and the camera system 24a are unimpeded, the radar system 38a and/or the ultrasonic system 40a provide unique information and redundancy, fill in gaps, and/or improve statistical accuracy. However, the simulation environments that may be assembled from the modeling data 10 discussed above provide no information about the reflections detectable by the radar system 38a and/or the ultrasonic system 40a.

Before further explaining solutions to these deficiencies, a brief overview is provided. An approach to modeling the reflections for a radar system 38 and/or an ultrasonic system 40 may begin by applying a machine learning algorithm to a set of training data to create a mapping, or probability distribution, for reflectivity coefficients conditioned, or based, on modeling data acquired by a camera system 24, a LIDAR system 20, and/or a position system. The set of training data, which may be stored on a set of physical media, may also include three-dimensional modeling data from a camera system 24, a LIDAR system 20, and/or a locational-awareness system. Additionally, the set of training data may also include physics modeling data, to model the reflection physics from the radar system 38 and/or an ultrasonic system 40. In some examples, the machine learning may involve training a neural network. In such, the probability distribution may be implemented as the neural network after training.

A second set of modeling data may also be acquired from a LIDAR 20, camera 24, and/or position system. The second set of modeling data may then be assembled into a set of surface regions to model an environment from which the second set of modeling data is captured. The set of surface regions may then be assigned reflection-coefficient values by applying the set of modeling data to the mapping, or probability distribution, generated by the machine learning on the set of training data.

A virtual sensor, such as a virtual radar and/or ultrasonic system, may be placed into the simulation environment. The virtual sensor may collect reflection data from transmissions from the virtual sensor, as reflected in accordance with reflection-coefficient values assigned to the set of surface regions in the simulation environment. This reflection data may be used as a dataset with which to develop, test, and/or evaluate a perception algorithm able to generate control signals to a vehicle 34 based on data from a radar sensor 38 and/or an ultrasonic sensor 40. Additional disclosures, explanations, and details are provided below.

Figure 3:
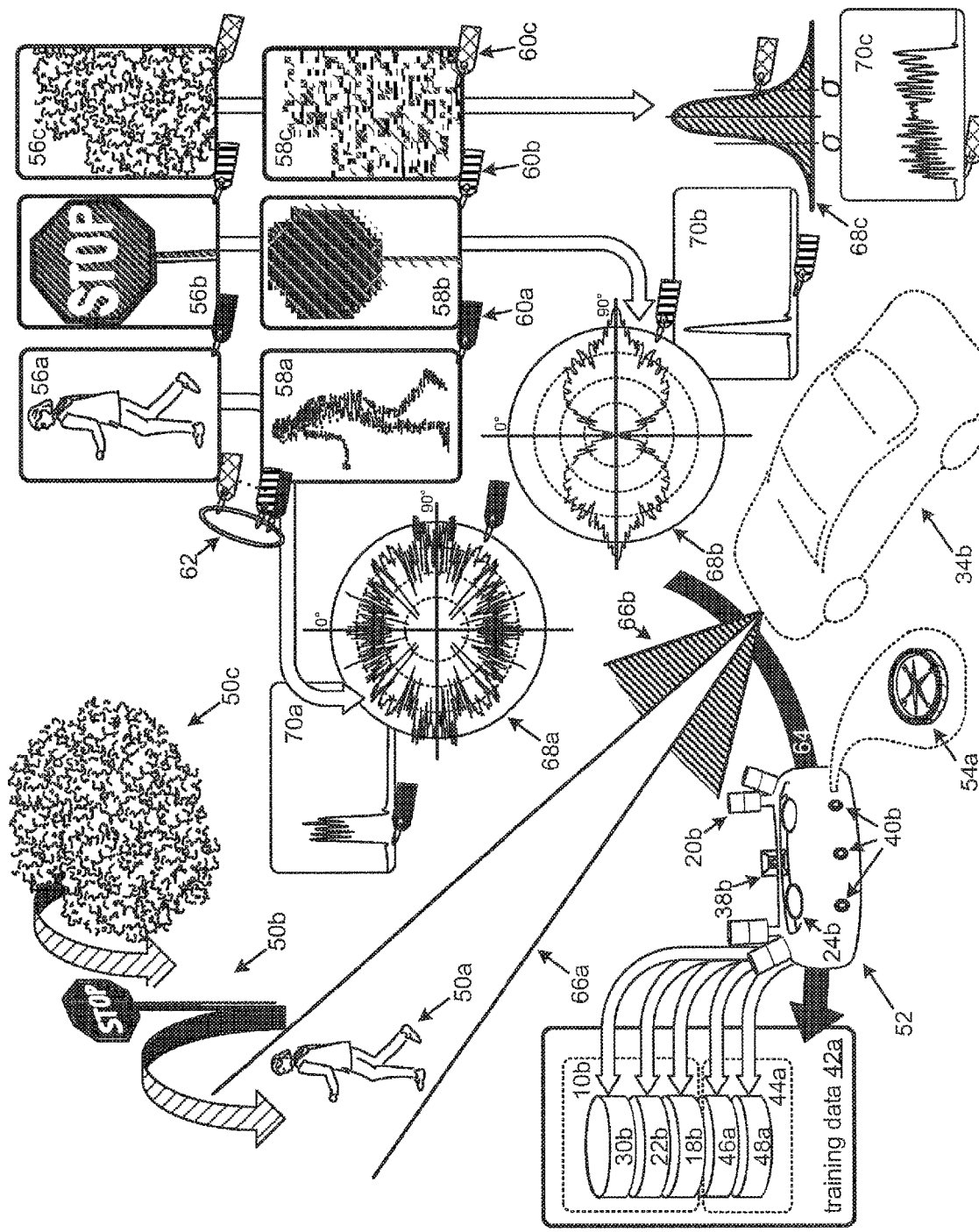
FIG. 3 is a schematic block diagram of training data that may be used to train a mapping from three-dimensional modeling data to reflection values by machine learning, in accordance with examples.

Referring to FIG. 3, the training data 42a, used to train a mapping from three-dimensional modeling data to reflection values, are explored in greater detail. A set of training data 42a may include a set of modeling data 10b similar to the modeling data 10a currently gathered by mapping and/or survey companies. In some examples, modeling data 10 may be referred to as three-dimensional modeling data 10, highlighting an ability of the data 10 to be assembled to create a three-dimensional model of its source.

The training data 42a may also include a set of reflection data 44a. In some examples, reflection data 44a may also be referred to herein as physics modeling data 44a because it may be used, as explained below, to model the physics of radio waves, microwaves, millimeter waves, and/or ultrasonic pressure waves as they are reflected off surfaces and/or volumes within a simulated environment. The reflection data 44a may include a fourth dataset 46a of data captured by a radar system 38b. Additionally, or in the alternative, the reflections data 44a may include a fifth dataset 48a of data captured by an ultrasonic system 40b.

In the figure, three different target objects 50a-c are depicted for which training data 42a is collected. The target objects 50a-c include a pedestrian 50a, a stop sign 50b, and some vegetation 50c. To collect the training data 42a for the various target objects 50a-c, a suite of sensors may be deployed on a sensor platform 52.

As with the vehicle 34a discussed previously, the sensor platform 52 may include a LIDAR system 20b, a camera system 24b to collect data respectively for the first dataset 18b and the second dataset 22b of the modeling data 10b. Additionally, one or more locational-awareness systems 54a may collect data for the third dataset 30b. Such systems 54 are also referred to herein as position systems 54. As used by mapping and/or survey companies, such locational-awareness systems 54 may include a GPS. These systems 54 may alternatively, or additionally, include other devices, such as, without limitation, a device providing information about the orientation of the vehicle 34b relative to a cardinal coordinate system, as indicated by the symbol of a compass, and/or in relation to the target object 50.

A number of different units of data collected for each of the three targets 50a-c are shown to facilitate discussion of the forms such units of data and the possibilities for collecting the same. As part of the collecting of a training set of modeling data 10b for a set of target objects, surfaces, or areas 50a-c, images 56a-c may be respectively taken of the pedestrian 50a, stop sign 50b, and vegetation 50c. In some examples, these images 56a-c may be cropped to focus on a particular target 50 to assist in machine learning. Additionally, three-dimensional LIDAR point clouds 58a-c may be acquired for the same set of target surfaces, materials, objects, or areas 50a-c. The LIDAR point clouds 58a-c may, in some examples, be focused in a manner similar to the cropped images 56a-c.

As indicated by the different label icons 60a-c with different patterns, targets 50, in the training data 44a may be identified with a set of labels 62 to enable supervised learning with the training data 44a. The images 56 and/or LIDAR point clouds 58 may be manually labeled individually or in groups where a series of images 56 and/or LIDAR point clouds 58 are gathered together for a common target object 50. The images 56a-c and/or LIDAR point clouds 58a-c may be correlated with data recorded by the locational-awareness system 54a, which may be captured at the same time. In some examples, various methods, known to those of ordinary skill in the art, may be used for registering the optical images 56a-c to the respective LIDAR point clouds 58a-c.

Inasmuch as the optical and/or three-dimensional information of the target 50a-c may vary with the orientation of the LIDAR 20b and/or camera 24b relative to those targets 50a-c, multiple images 56 and/or point clouds 58 may be collected for each object 50a-c from multiple different angles describable around the objects 50a-c with respect to azimuth 64 and/or elevation and/or at different distances to the objects 50a-c. In some examples, the locational-awareness system 54 may record corresponding orientations from which data are collected. The multiple images 56 and/or point clouds 58 may receive a common label 60 and/or may grouped together as pertaining to a common target 50. Such a group of images 56 and/or point clouds 58 would be capable of being assembled into a three-dimension virtual object modeling the target object 50. In accordance with the nature of machine learning, images 56 and/or point clouds 58 may be collected for large numbers of target 50 classifiable under each of the labels 60 in the set of labels 62 for supervised machine learning.

With respect to the collecting of a training set of reflection data 44a for a set of targets 50a-c, the radar system 38b may transmit radio, microwave, and/or millimeter electromagnetic waves at powers, by way of example and not limitation, of about 20 Watts of Equivalent Isotropically Radiated Power (EIRP). The radar system 20b may collect data in terms of voltages induced by reflections of the transmitted electromagnetic waves from the same targets 50a-c. Such data may include intensity, phase, polarity, and/or Doppler shift information and may be resolved into different range bins.

Similarly, an ultrasonic system 40b may, additionally or in the alternative, collect data measuring reflected pressure waves at ultrasonic frequencies. The depicted units of ultrasonic data 70a-c show the intensity of reflections, for a single orientation, with respect to distance, which, like the radar data 68, may be resolved with respect range bins. Hence, whereas, the ultrasonic data 70b for the stop sign 50b has a single narrow spike, the ultrasonic data 70b for the vegetation 50c demonstrates a more mild, but sustained response.

The radar system 38b and/or ultrasonic system 40b may be capable of generating multiple different beams 66a-b around the vehicle 34b, which may have different beam widths and/or ranges. In FIG. 3, a narrow beam 66a with a long range is shown is shown, together with a wide beam 66b with a short range. In some examples, different beams 66 may be designed to address different issues. For example, and without limitation, different beams 66 may be used and/or designed to avoid side impacts, for blind spot detection, for lane departure warning, for adaptive cruise control, for stop and go accident avoidance, for pre-crash accident mitigation, for pedestrian detection, for collision avoidance and/or emergency braking, for parking assistance, for environmental mapping, and/or the like.

As with the images 56 and/or point clouds 58, the radar system 38b and/or the ultrasonic system 40a may collect data from multiple different angles describable around the objects 50a-c with respect to azimuth 64 and/or elevation and/or at different distances to the objects 50a-c. In some examples, different subsets of data pertaining to the fourth dataset 46a and/or fifth dataset 48a may be collected for different beams 66a-b.

Some of the collected units of radar data 68a-b are depicted as radar cross-sections 68a-b suggestive of the grouping of measurements from different angles around the subject objects 50a-b. Such radar cross-sections 68a-b may include measurements from a common range bin corresponding to a common distance around the target objects 50a, 50b. Different measurements may be obtained at different range bins. Similar groupings may be made with ultrasonic data 70.

The radar data 68 and/or ultrasonic data 70 may be correlated within the training set of modeling data 10b. For example, with respect to the radar data 68, the measurements on the cross sections 68a, 68b may be stamped with orientation information from the locational-awareness system 54a, just as the depicted images 56a, 56b and point clouds 58a, 58b for the pedestrian 50a and stop sign 50b respectively. The curved black arrow 64 in FIG. 3 describes a circular path 64 around a target 50a. In such examples, the target 50a may serve as the origin of a circular, or spherical, coordinate system. Accordingly, he black arrow 64 traverses multiple angular measurements for the azimuth relative to the origin, or target 50a, which angular measurements may correspond with different orientation angles for measurements relative to the target 50a for the depicted images 56a, 56b and point clouds 58a, 58b. Additionally, in correlating the radar data 68 and/or ultrasonic data 70 with the modeling data 10b, common distances between range bins and points in the point clouds 58 may be used to correlate LIDAR data 58 with radar data 68 and/or ultrasonic data 70 for a common location and/or orientation.

As can be appreciated, different target 50a-c may differ drastically with respect to their response as a function of orientation. For example, the radar cross section 68b for the stop sign 50a, is quite strong when detected from a direction normal to the surface of the sign 50b, but is virtually non-existent from a parallel direction. Conversely, the radar and/or ultrasonic signal for the vegetation 50c is virtually agnostic to orientation. Hence, radar data 68c for the vegetation 50c is depicted as a probability distribution for a random variable that may be generated by combining multiple measurements of the vegetation 50c. Similar random variables may be generated for different orientations of target objects 50 whose radar and/or ultrasonic responses are sensitive to orientation. The probability distribution depicted for the radar data 68c is Gaussian, but other distributions are possible.

The radar data 68 and/or ultrasonic data 70 may record reflections in different forms. For example, reflection values may be recorded as radar cross sections 68a-b and/or ultrasonic cross section. However, in many situations, where the target 50 takes up a substantial portion of the field of view, or the field of view includes many different types of reflective surfaces and/or volumes, it may be more helpful to think in terms of a reflection coefficient. Hence, in many examples, the target objects 50 may be target materials, surfaces, and/or areas 50. In such examples, the radar data 68 and/or ultrasonic data 70 may include values and/or random variables for reflection coefficients for the labeled target materials, surfaces, and/or areas 50. As discussed below, such reflection coefficients may then be assigned to different surfaces and/or materials in a three-dimensional virtual environment to create a physical, or physics, model, capable of creating simulated radar data 68 and/or ultrasonic data 70 in response to a virtual radar system and/or a virtual ultrasonic system placed in the three-dimensional virtual environment.

Since the set of training data 42a may be indexed to labels 60 for a set of object categories 62, the training set 42a may be used for supervised learning. Although multiple labels 60 are depicted for different types of data, where the different datasets in the training set 42a are correlated, labeling in a single dataset may be sufficient. Although in the example depicted, target objects 50a-c are isolated for the capturing of training data 42, in other examples, training data 42 may be collected from a target rich environment and individual targets may be manually identified and/or labeled at a later time. As can be appreciated, training data 42 may be acquired in different ways and may take a number of different forms. Once the training data 42 is acquired, it can be applied to a machine learning module.

Figure 4:
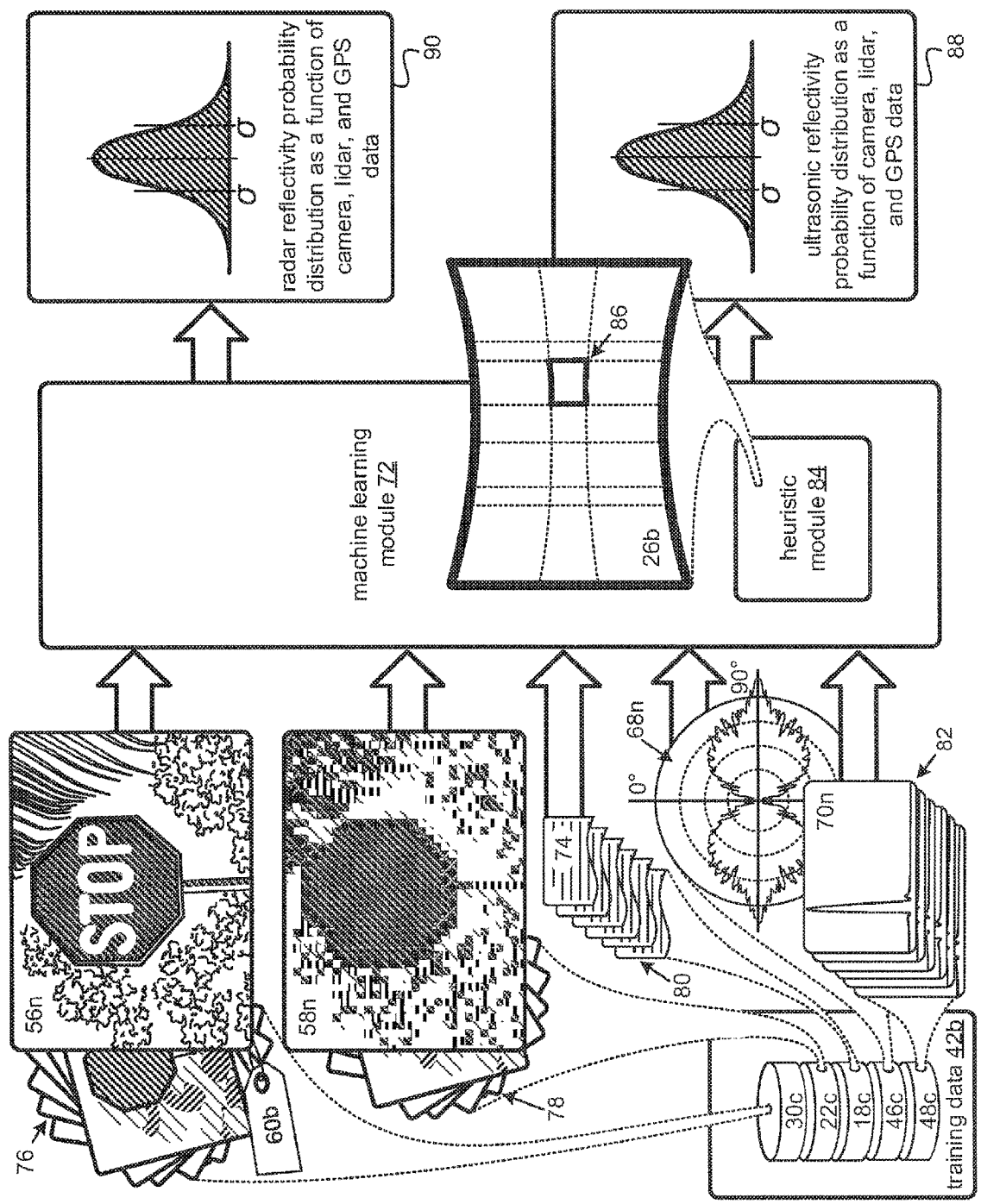
FIG. 4 is a schematic block diagram of a machine learning module used to train the mapping from three-dimensional modeling data to reflection values with the training data, in accordance with examples.

Referring to FIG. 4, a machine learning module 72 is depicted. The machine-learning module 72 may be implanted on a set of computing processors, or processor set. As used herein, the terms set and subset may include any number of elements, including a single element. The machine learning module 72 may implement any one of a number of different types of machine learning algorithms selected to learn a mapping to physical modeling characteristics from three-dimensional modeling information.

As used herein, the term physical modeling characteristics refers to various reflection values, such as, without limitation, radar and/or ultrasonic cross sections and/or reflection coefficients. Such reflection values may be assigned to objects, materials, surfaces, and/or volumes within a three-dimensional simulation of an environment to simulate the physics of reflections from transmissions from virtual radar systems and/or virtual ultrasonic systems placed in the simulation environment. As used herein, the term three-dimensional modeling information refers to information describing an object and/or environment in three-dimensional space. Different examples of modeling data such as the examples of modeling data 10a, 10b discussed with respect to FIG. 1 and FIG. 3 provide examples of the types of data and/or information included within three-dimensional modeling information. However, other examples are possible, such as, without limitation, synthetically-designed examples.

The machine learning module 72 may train its machine learning algorithm(s) with training data 42 prepared along lines similar to those discussed above. Hence, to train a machine learning algorithm to provide reflection values for a street sign, and/or possibly a stop sign, FIG. 4 depicts a unit of cloud points 58n, an image 56n, a unit of location/orientation information 74, radar data 68n and ultrasonic data 70n with a label 60b for a stop sign. Unlike the isolated stop sign 50b in the previous figure, the particular stop sign depicted here is captured surrounded by other signal sources, including the palm branch and other vegetation. To be effective, the machine learning algorithm must be exposed to large numbers of instances of each category 60 of object, surface, material, volume, and/or the like with many different variations. Non-limiting examples of sources of such variations may arise, for example, from a number of different orientations and/or distances.

In some examples, the machine learning module 72 may consider, or take into account, information from, a single image, measurement, and/or unit from the various datasets 30c, 22c, 18c, 46c, 48c for a given location and/or orientation for a given training session. In such examples, the group of images 76, the group of point clouds 78, the group of units of location/orientation information 80, radar data 68 and group of ultrasonic data 82 may include images of a number of distinct instances of stop signs with several different combinations of variations for several different training sessions. In other examples, the machine learning module 72 may consider entire groups of images 76, groups of units of cloud points 78, groups of units of location/orientation information 80, radar data 68 and groups of ultrasonic data 82 together, across multiple orientations and/or distances.

For certain examples, a heuristic module 84 may be included with and/or communicatively coupled to the machine learning module 72. The heuristic module 84 may identify aspects of three-dimensional modeling data subject to heuristics informing the machine learning module 72. For example, the heuristic module 84 may tag portions of training data 42 and/or modeling data used for mapping that correspond to regions 86 in an environment from which the training data 42 and/or modeling data is collected. Such regions 86 may be tagged because they may be correlated with ranges of reflection-coefficient values and/or other reflection values, such as a location 86 relative to an overall field of view 26*b* of a sensor, used in capturing the training data, from which a portion of the training data originates.

For example, stop signs may commonly appear in a predefined region 86 of the field of view 26*b* of a given sensor, such as a camera system. An example heuristic may increase the likelihood that a portion of an image 56*n* taken from this region is a stop sign. By way of another example, with respect to radar systems 38 and/or ultrasonic systems 40, different heuristics may be developed for different beams of a vehicle 34. For example, a common signal detected in a side beam may correspond to a curb. The heuristic module 84 may indicate the beam from which data are obtained. Many different additional types of heuristics may be developed for combinations of data based on orientations, relationships between signals and/or other properties associated with recurring patterns.

After application of the training data 42, the machine learning module 72 may provide one or more ultrasonic mappings 88 and/or radar mappings 90 from three-dimensional modeling information to reflection values. In some examples, different mappings 88/90 may be trained for different beams 66 utilized by a vehicle 34. Mappings 88/90 may result from a single type of algorithm or a combination of algorithms. For example, one approach may apply a dimensionality reduction algorithm on its own, while others may apply the algorithm before or after another algorithm. The nature of the mapping 88/90 may depend on the nature of the machine learning algorithm(s). In some examples, a mapping 88/90 may be a function to assign certain reflection values in response to certain characteristic signatures in modeling data.

More sophisticated mapping 88/90 may take into account randomness and uncertainty. In many examples, the mapping 88/90 may provide a probability distribution 88/90 for reflection values, such as reflection coefficients. Training may take the form of conditional training in which a conditional probability is trained directly on the training set 42. Generative training may also be used to find the class-conditional distribution and the class prior with the training set 42, the conditional distribution being derivable by Bayes rule. Harnessing the set of categories 62 indexed with labeled modeling data 10 of the training data 42, different forms of classifiers may be used for machine learning algorithms. By way of example and not limitation, additional details for certain examples are provided below.

Figure 5:
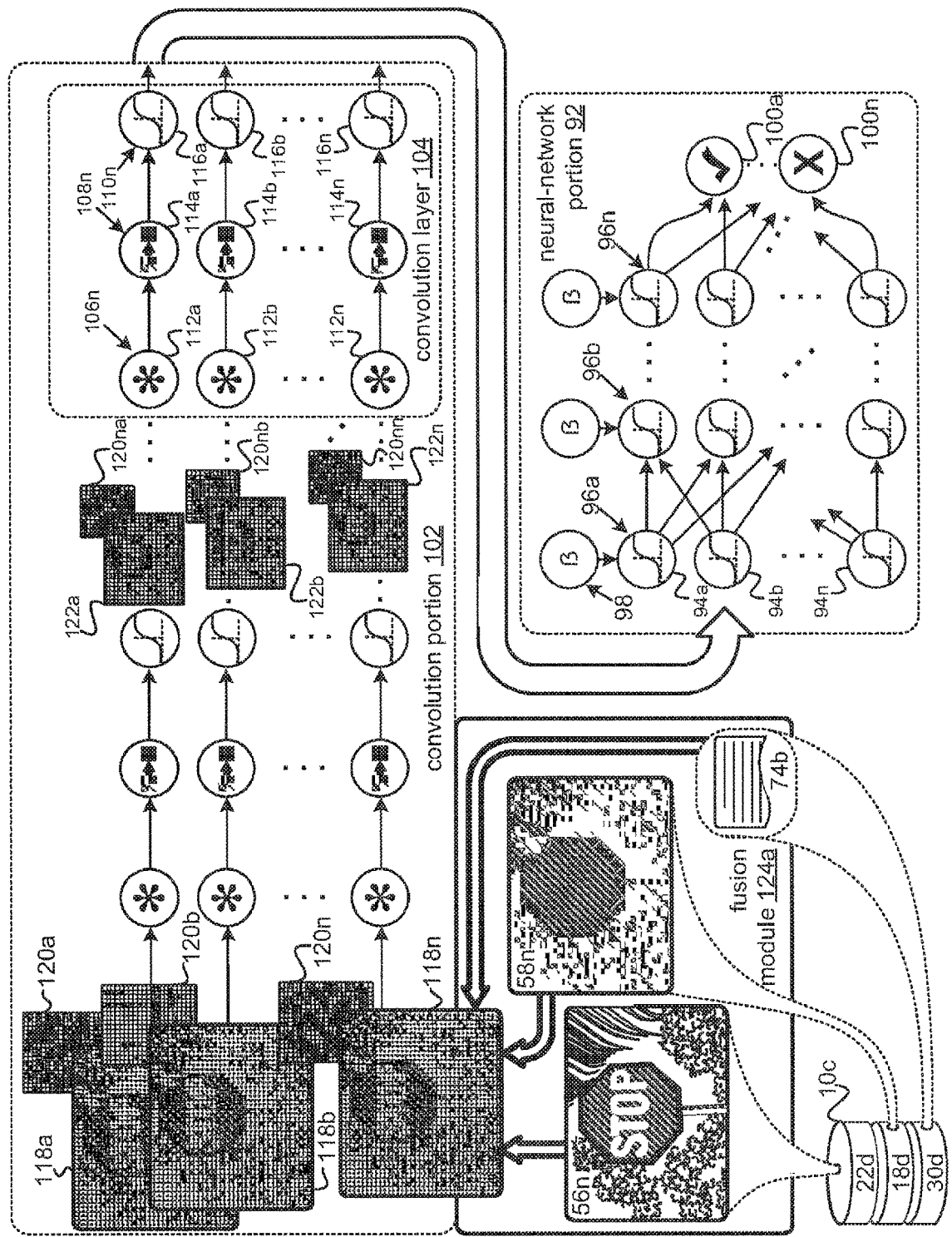
FIG. 5 is a schematic block diagram of a non-limiting example of machine learning constituting a neural network and Convolution Neural Network (CNN), in accordance with examples.

Referring to FIG. 5, a deep neural network 92, as may be utilized by the machine learning module 72, is depicted. The deep neural network 92 may be trained with supervised learning using the labels 60 indexed to the training dataset 42 and may serve as a classifier. After training, the deep neural network 92 itself may implement the probability distribution 88/90.

A deep neural-network 92 may include a number of nodes 94*a-n* in each of a large number of layers 96*a-n*. Each of the nodes 94 may apply a non-linear function, where the outputs of each node 94 are duly weighted and communicated to activate each neuron/node 94 in the next sublayer 96. During training, these weights may be tuned to optimize the ability of the neural network 92 to provide probabilities correctly identifying whether or not training data 42 is representative of different categories 62 used to label the training data 42 at the output nodes 100*a-n* of the neural network 92, as represented by the checkmark and 'X' symbols.

Since neural networks 92 are tailored to receive inputs as scalars and/or vectors, some preprocessing may be added to preprocess images 56, point clouds 58 and/or other forms of similarly complex data not in scalar or vector form. In certain non-limiting examples for such preprocessing for images 56 and/or point clouds 58, the deep neural network 92 can be implemented with at Convolution Neural Network (CNN) 102, which may include multiple convolution layers 104.

A convolution layer 104*n* may include one or more sublayers, such as, without limitation, a convolution sublayer 106*n*, a subsample sublayer 108*n*, and/or a non-linear sublayer 110*n*, which may respectively include convolution neuron/nodes 112*a-n*, non-linear neuron/nodes 114*a-n*, and/ or subsampling neuron/node 116*a-n*. A forward-feed in the convolution portion 102 may begin with an exemplary input 118*a-n* of multiple copies, which may be two-dimensional images and/or three-dimensional models. At each convolution layer 104, different filters, or kernels, from a first set of filters/kernels 120*a-n* through an $n^{th}$ set of filters/kernels 120*na-nn*, which may be tuned during training and may be convolved with the input to produce a smaller feature map 122*a-n*, until scalars, or vectors are produced as inputs for the neural network 92.

In some examples, different types of datasets 18*d*, 22*d*, 30*d* may be applied separately to different CCNs 102 and then combined for the neural network 92, or, in certain examples, after the neural network 92. In other examples, a fusion module 124*a* may be provided to combine datasets 18*d*, 22*d*, 30*d* to produce the exemplary inputs 118*a-n* before application to a single CCN 102 along lines such as, without limitation, those discussed above in relation to FIG. 3. Although in many examples both modeling data 10 and reflection data 42 may be used in training, the example depicted in FIG. 5 only uses modeling data 10*c*. In such examples, the machine learning module may be trained to identify objects, surfaces, materials, and/or volumes within the set of categories 62 for which training data 42 is labeled. For such examples, once a category is determined, corresponding reflection values and/or probability distributions may be developed from the reflection data 44 with corresponding labels 60.

Figure 6:
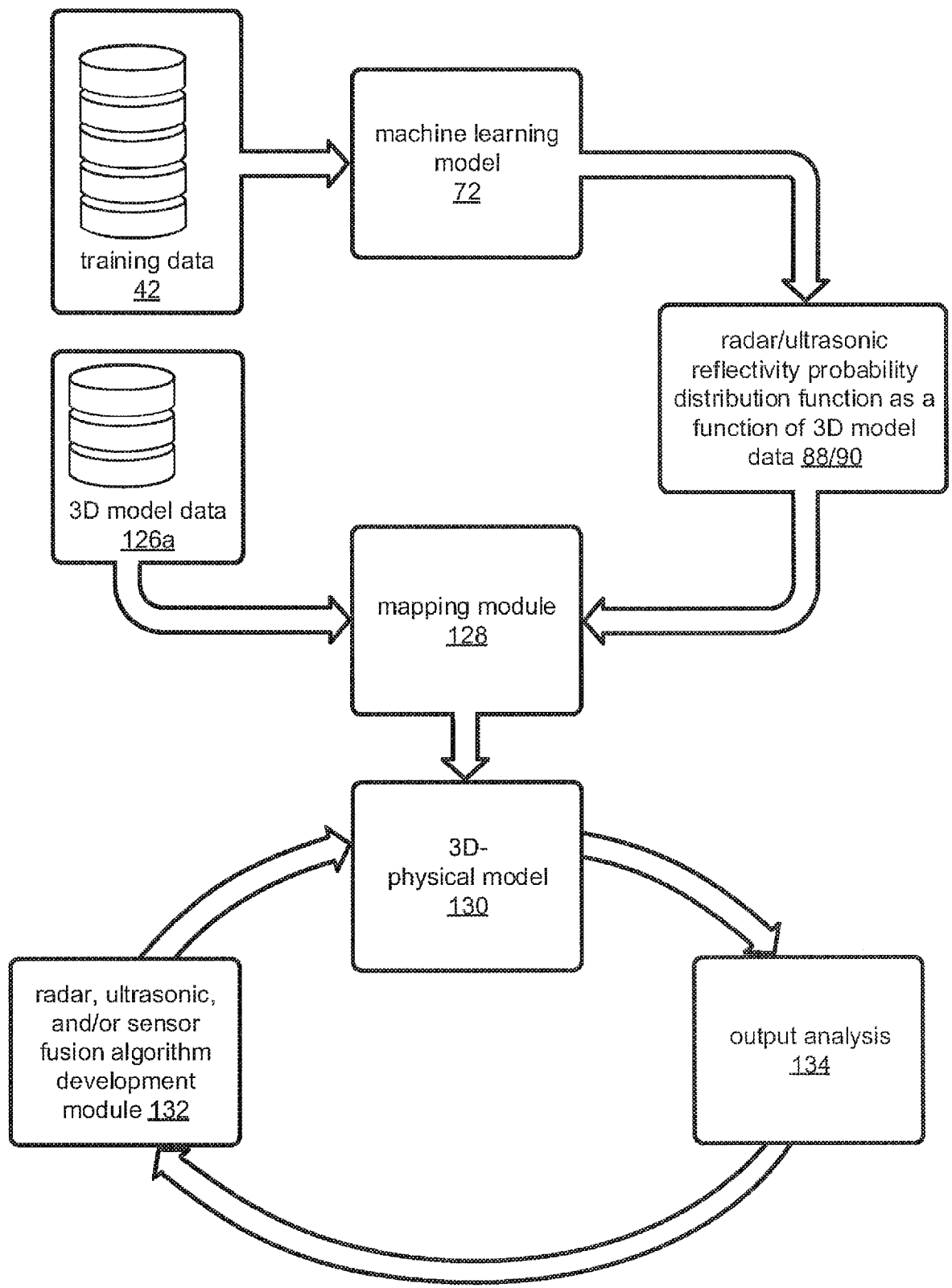
FIG. 6 is a block diagram of elements providing a simulation environment for developing, testing, and/or evaluating reflection algorithms, in accordance with examples.

Referring to FIG. 6, relationships are depicted between elements enabling a virtual environment for developing, testing, and evaluating algorithms for processing radar 68 and/or ultrasonic data 70. As explained in relation to the previous figures, a set of training data 42 may be applied to a machine learning module 72 to create a mapping, or probability distribution, 88/90 to assign reflection values. Once the mapping, or probability distribution, 88/90 has been established, it may be applied to a new set of modeling data 126, also referred to herein as a set of virtual-environment data 126, and three-dimensional modeling information 126, which may be stored on a set of physical media, or physical media set. As with the training modeling data 10, the new set of modeling data may be captured by a camera system 24, a LIDAR system 20, and/or a locational-awareness system 30. Such three-dimensional modeling information 126 may be collected to be sufficient to generate a three-dimensional model of a virtual object and/or environment.

A mapping module 128 may create a physical model 130 for a virtual environment by applying the mapping 88/90 to the three-dimensional modeling information 126. The physical model 130 may then provide reflection values for a virtual radar and/or a virtual ultrasonic system in the virtual environment 130. Such simulation environments 130 may be used to test, develop, and/or evaluate algorithms 132 for processing reflection data receivable by radar systems 38 and/or ultrasonic systems 40.

For example, a test bench may interface with the physical model 130 to implement a test algorithm 132 over a path through the virtual environment 130. The test algorithm 132 may then process reflection values received from the virtual environment throughout the path and provide outcomes 134 in the form of, without limitation, detections, classifications, and determinations. The outcomes 134 may be analyzed and fed into additional algorithm development 132. Additional details regarding potential approaches to developing physical modeling environments 130 and testing algorithms 132 are discussed further below.

Figure 7:
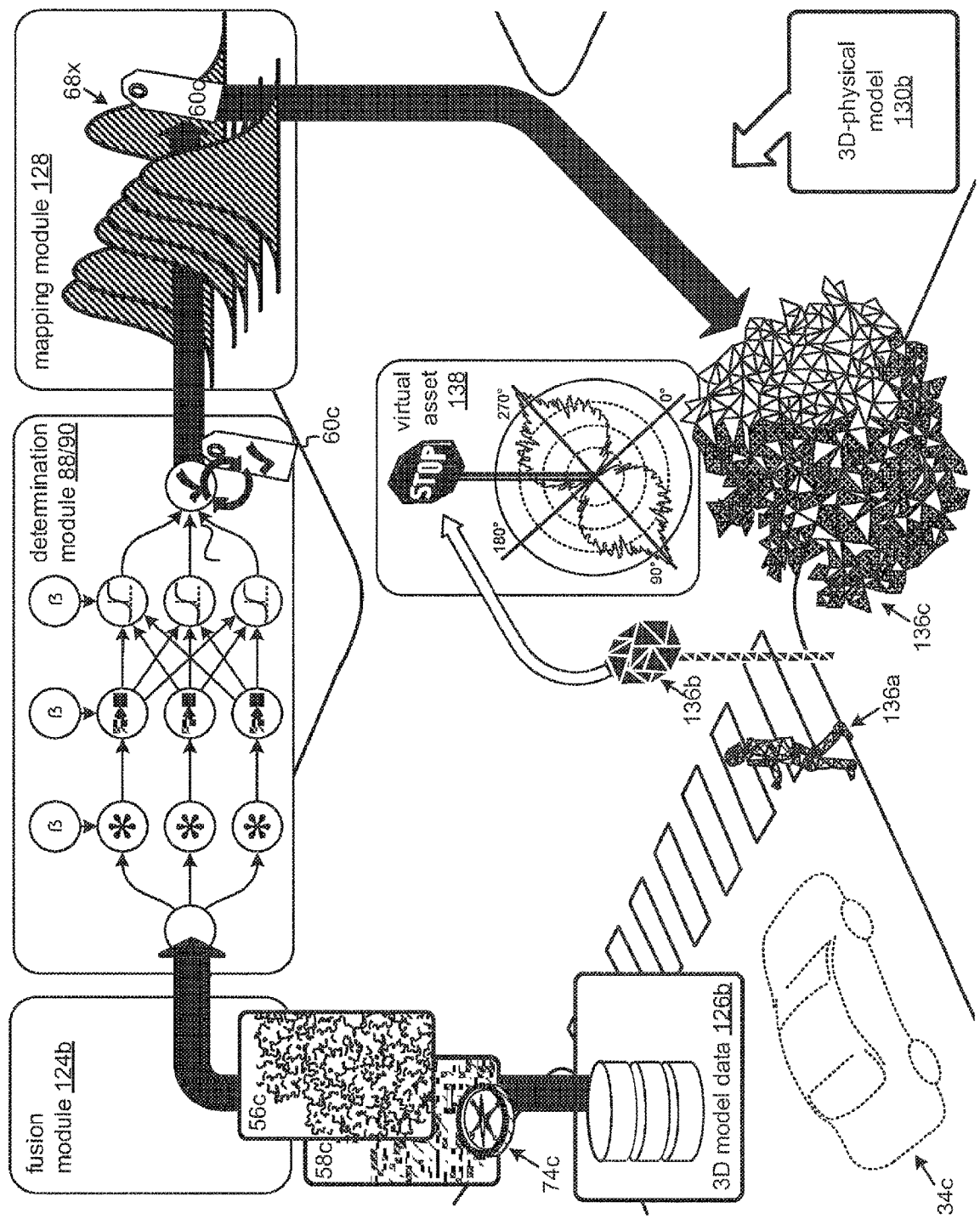
FIG. 7 is a depiction of a context in which a mapping module enhances a simulation environment by assigning reflection values to surfaces and objects therein, in accordance with examples.

Referring to FIG. 7, additional context is provided for the mapping of reflection values to three-dimensional modeling data. FIG. 7 depicts a new set of three-dimensional modeling data 126*b*, which may include the image 56*c*, LIDAR cloud points 58*c*, and/or position/orientation data 74*c*, separate and apart from the labeled set of modeling data 10 used for training of the machine learning algorithm(s). This new set of three-dimensional modeling data 126*b* is depicted with the three-dimensional rendering of the environment from which the data 126*b* was collected.

In some examples, a fusion module 124*b*, or model generation model 124*b*, which may reside with or be communicatively coupled to the mapping module 128, may be executable on the processor set to assemble the additional set of three-dimensional modeling data 126*b* into the model of the virtual environment. Additionally, or in the alternative, in certain examples, such a model generation module 124*b* may generate one or more individual, three-dimensional objects. As with the training modeling data 10, the new set of modeling data 126*b* may include point cloud data 58, which may serve as the backbone of the three-dimensional models. Such point cloud data 58 may be stitched together to form complete objects and/or environments with location and/or orientation data 74, all of which may serve together to support the additional information provided by the camera images 56.

As the new modeling data 126*b* is assembled, a set of surfaces may be joined together upon which reflection values may be painted upon a determination of what those reflection values are. To this end, the mapping 88/90, or probability distribution 88/90 may be trained. The mapping module 128 may then apply the mapping 88/90 to the additional set of three-dimensional modeling data 126*b* by assigning reflectivity coefficients and/or values to surfaces in the three-dimensional model.

In the example, the determination module 88/90 is shown as a trained neural network 92. However, several different forms may be taken depending on the machine learning algorithms relied upon. Also, as discussed above, a CNN 102 may be applied to prepare multidimensional datasets. Depending on the example, the new modeling data 126*b* may be applied to the determination module 88/90 before or after being assembled and/or in different stages of assembly. In some examples, based on the new modeling data 126, the determination module 88/90 may assign reflection coefficients with a level of granularity that goes down to individual pixels, voxels, and/or texels.

Where the determination module 88/90 serves as a classifier, assignments of reflection values, such as, without limitation, reflection coefficients and/or reflection cross sections, may be determined by the labels 60 of the training data 42. In such examples, once an object, region, surface, material, and/or volume from the new set of modeling data 126*b* is detected, identified, and/or classified in accordance with a label 60*c* from the set of categories 62 used to label the training data 42, the mapping module 128 may select and/or assign a corresponding reflectance value or random variable 68*x*. The assigned value or random variable 68*x* may be derived from reflectance data 44 within the training data 42 sharing the same label 60*c* as and/or other characteristics of the category identified by the determination module 88/90.

The mapping module 128 is depicted in FIG. 7 in the process of assigning reflection values to the simulated environment. Three dimensional surfaces are represented by the various triangular shapes joined together, also referred to herein as texels, or texture pixels. However, as can be appreciated, any number of different approaches to dividing such regions may be utilized. Each region or texel may have its own orientation and be assigned its own reflectance coefficient.

As the mapping module 128 applies the mapping 88/90 to the additional set of three-dimensional modeling data 126*b* by assigning reflectivity values to surfaces, it 88/90 may also do so for three-dimensional model objects, such as the pedestrian 136*a*, the stop sign 136*b*, and vegetation 136*c*, on which the mapping module 128 is still working. In the process, the mapping module 128 may create virtual objects, or assets, 138. Not only may such virtual assets serves a role in the simulated environment depicted in FIG. 7, they may also be used for positioning in, and/or as building blocks for, other synthetic and/or simulated environments. By way of providing an example of a non-limiting alternative, a different type of virtual object, or asset, 138 is also depicted for the stop sign. As opposed to reflection coefficients, the mapping module 128 may assign a reflection cross section to a virtual object classified as a stop sign by the determination module 88/90.

Once the three-dimensional model is extended to a physical model simulating reflections from radar and/or ultrasonic waves, it may be used to develop, test, and evaluate algorithms 132 for processing radar data 68 and/or ultrasonic data 40 by utilizing virtual radar and/or ultrasonic data gathered from the simulated environment and/or simulated objects. Acquisition of such virtual datasets may be acquired by placing a virtual vehicle 34*c* within the simulation environment 130*b* coupled to the virtual sensor and capable of traveling a path through the simulation environment 130*b*. By way of a non-limiting example for how the output by an algorithm 132 processing such virtual datasets may be evaluated, in some examples, based on the outputs, the algorithm 132 may send control signals to the virtual vehicle 34*c*, the performance of which in the emulated 130*b* may then be observed.

More specifically, some examples may include a set of test benches, implemented on the processor set. The test benches may include one or more Hardware-In-Loop (HIL) systems operable to provide mathematical models for the mechanical dynamics of the virtual vehicle 34*c*. Additionally, the HIL systems may include dynamics virtual radars and/or virtual ultrasonic systems. Additionally, the set of test benches may include a Software-In-Loop (SIL) system communicably coupled to the HIL system(s). The SIL system may implement a test algorithm 132 over the virtual-environment path. Meanwhile, the test algorithm 132 may process reflection values from the virtual environment 130*b* and provide control signals to the virtual vehicle 34*c*.

Figure 8:
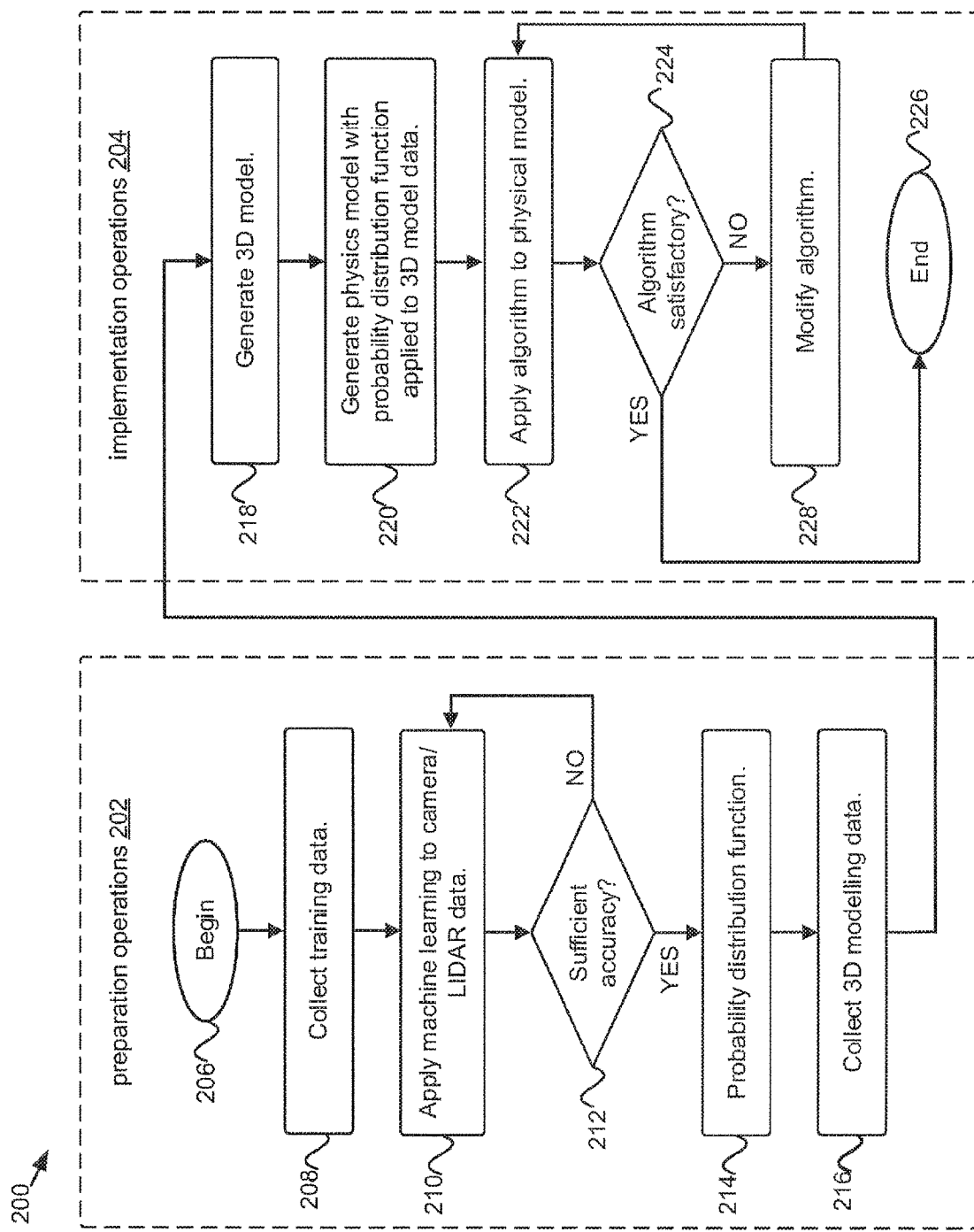
FIG. 8 is a flowchart for developing a simulation environment in which an algorithm, responsive to sensor data from radar systems and/or ultrasonic systems, may be developed, in accordance with examples.

Referring to FIG. 8, methods 200 are depicted for developing a simulation environment capable of providing reflection data for virtual radar and/or ultrasonic sensors with which to test and/or develop algorithms 132 for processing such data. Such steps may include both preparation operations 202 and implementation operations 204. With respect to the preparation operations 202, such methods 200 may begin 206 by collecting 208 training data 42, which may include modeling data 10 and reflection data 44. Machine learning algorithms 132 may be applied 210 to the training data 42.

A determination 212 may be made as to whether the machine learning algorithms 132 have been sufficiently trained to accurately classify targets 50 for a set of categories 62 labeling the training data 42 is labeled and/or provide probability distributions with reference to the reflection data 44. If results are not sufficiently accurate, applying 210 of training data 42 to the machine learning algorithms 132 may continue.

If the results are accurate, a mapping and/or probability distribution 88/90 may result 214. A new, additional set of three-dimensional modeling information 126, which may be used to structure the reflection simulation environment 130, may be obtained 216. With this structure, implementation operations 204 may commence.

During implementation, a three-dimensional model may be generated 218 by assembling a set of surface regions from the new set of modeling data 126 to form a three-dimensional, virtual object and/or environment. A physics model 130 may then be generated 220 to overlay the three-dimensional, virtual object and/or environment by assigning reflection values, and/or reflection-coefficient values to the set of surface regions. Simulated reflection data may be collected from transmissions from a virtual sensor placed within the simulation environment 130, as reflected in accordance with reflection-coefficient values assigned to the set of surface regions.

An algorithm 132, such as a perception algorithm 132, may be applied 222 to the physical model 130 by testing the perception algorithm 132 on the simulated reflection data. Based upon output, a second determination 224 may be made as to whether the algorithm 132 satisfactorily processes the simulated reflection data. If the algorithm 132 performs satisfactorily, the method 200 may end 226. Otherwise, the algorithm 132 may be modified 228, possibly based on the results of the test, and the method 200 may return to the step of applying 222 the modified algorithm. In some examples, new simulated reflection data may be generated for a new test.

In the above disclosure, reference has been made to the accompanying drawings, which form a part hereof, and in which is shown by way of illustration specific implementations in which the disclosure may be practiced. It is understood that other implementations may be utilized and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Implementations of the systems, devices, and methods disclosed herein may comprise or utilize a special purpose or general-purpose computer including computer hardware, such as, for example, one or more processors and system memory, as discussed herein. Implementations within the scope of the present disclosure may also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media (devices). Computer-readable media that carry computer-executable instructions are transmission media. Thus, by way of example, and not limitation, implementations of the disclosure can comprise at least two distinctly different kinds of computer-readable media: computer storage media (devices) and transmission media.

Computer storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links, which can be used to carry desired program code means in the form of computer-executable instructions or data structures and which can be accessed by a general purpose or special purpose computer. Combinations of the above should also be included within the scope of computer-readable media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, an in-dash vehicle computer, personal computers, desktop computers, laptop computers, message processors, handheld devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Further, where appropriate, functions described herein can be performed in one or more of: hardware, software, firmware, digital components, or analog components. For example, one or more application specific integrated circuits (ASICs) can be programmed to carry out one or more of the systems and procedures described herein. Certain terms are used throughout the description and claims to refer to particular system components. As one skilled in the art will appreciate, components may be referred to by different names. This document does not intend to distinguish between components that differ in name, but not function.

It should be noted that the sensor embodiments discussed above may comprise computer hardware, software, firmware, or any combination thereof to perform at least a portion of their functions. For example, a sensor may include computer code configured to be executed in one or more processors, and may include hardware logic/electrical circuitry controlled by the computer code. These example devices are provided herein for purposes of illustration, and are not intended to be limiting. Embodiments of the present disclosure may be implemented in further types of devices, as would be known to persons skilled in the relevant art(s).

At least some embodiments of the disclosure have been directed to computer program products comprising such logic (e.g., in the form of software) stored on any computer useable medium. Such software, when executed in one or more data processing devices, causes a device to operate as described herein.

While various embodiments of the present disclosure have been described above, it should be understood that they have been presented by way of example only, and not limitation. It will be apparent to persons skilled in the relevant art that various changes in form and detail can be made therein without departing from the spirit and scope of the disclosure. Thus, the breadth and scope of the present disclosure should not be limited by any of the above-described exemplary embodiments, but should be defined only in accordance with the following claims and their equivalents. The foregoing description has been presented for the purposes of illustration and description. It is not intended to be exhaustive or to limit the disclosure to the precise form disclosed. Many modifications and variations are possible in light of the above teaching. Further, it should be noted that any or all of the aforementioned alternate implementations may be used in any combination desired to form additional hybrid implementations of the disclosure.

The invention claimed is:

1. A system, comprising:
a processor set configured to process a set of training data, the set of training data comprising:
three-dimensional modeling data from at least one of a camera system, a LIght-Detection-And-Ranging (LI-DAR) system, and a locational-awareness system; and
physics modeling data from at least one of a radar system and an ultrasonic system;
a machine learning module which, when executed by the processor set, learns a mapping to physical modeling characteristics from three-dimensional modeling information;
a mapping module which, when executed by the processor set, creates a physical model for a virtual environment by applying the mapping to the three-dimensional modeling information, the physical model providing reflection values for at least one of a virtual radar and a virtual ultrasonic system in the virtual environment; and
a model generation module which, when executed by the processor set, assembles the three-dimensional modeling information into the three-dimensional model of the virtual environment,
wherein the mapping module, when executed by the processor set, also applies the mapping to the three-dimensional modeling information by assigning reflectivity coefficients to surfaces in the three-dimensional model of the virtual environment for reflectivity of each of the surfaces.

2. The system of claim 1, wherein
the three-dimensional modeling information carries information with which to generate a three-dimensional model of a virtual environment.

3. The system of claim 2, further comprising a test bench, implemented on the processor set, operable to implement a test algorithm over a path through the virtual environment, the test algorithm processing reflection values received from the virtual environment throughout the path and providing outcomes in the form of at least one of detections, classifications, and determinations.

4. The system of claim 2, further comprising a set of test benches, implemented on the processor set, comprising:
at least one Hardware-In-Loop (HIL) system operable to provide mathematical models for mechanical dynamics of a virtual vehicle as it travels a path through the virtual environment and dynamics for the at least one of the virtual radar and the virtual ultrasonic system; and
a Software-In-Loop (SIL) system communicably coupled to the at least one HIL system and operable to implement a test algorithm over the path through the virtual environment, the test algorithm processing reflection values received from the virtual environment throughout the path and providing control signals to the virtual vehicle.

5. The system of claim 1, further comprising:
a model generation module which, when executed by the processor set, assembles the three-dimensional modeling information into a three-dimensional model of a virtual object; and wherein
the mapping module, when executed by the processor set, is further operable to apply the mapping to the three-dimensional modeling information by assigning reflectivity coefficients to surfaces of the three-dimensional model of the virtual object for reflectivity of each of the surfaces of the virtual objects, creating the virtual object for positioning in a virtual environment with a reflection cross-section for at least one of the virtual radar and the virtual ultrasonic system relative to the virtual object.

6. The system of claim 1, wherein:
the set of training data is indexed to labels for a set of target categories; and
the machine learning module comprises a deep neural network operable to be trained with supervised learning using the labels indexed to the set of training data.

7. The system of claim 6, wherein the deep neural network further comprises a classifier implemented with a convolution neural network.

8. The system of claim 1, further comprising a heuristic module within the machine learning module, and wherein, when executed by the processor set, identifies aspects of the three-dimensional modeling data subject to a set of heuristics informing the machine learning module.

9. A method for physical modeling, further comprising:
applying a machine learning algorithm to a set of training data to create a probability distribution for reflection coefficients conditioned on a set of modeling data of surface reflectivity acquired by at least one of a camera system, a LIght-Detection-And-Ranging (LIDAR) system, and a position system; and
assigning reflection values to the set of modeling data by applying the set of modeling data to the probability distribution using a mapping function,
wherein the assigning the reflection values comprises assigning the reflection values to a set of surface regions for reflectivity of each of the set of surface regions, and
wherein the applying the machine learning algorithm to the set of training data comprises:
performing supervised learning on a deep neural network with the training data; and
after training, the deep neural network implements the probability distribution.

10. The method of claim 9, further comprising:
assembling a set of surface regions from the set of modeling data to model a simulation environment simulating an environment from which the set of modeling data is captured;
the step of assigning the reflection values further comprises:
collecting reflection data from transmissions from a virtual sensor placed within the simulation environment, as reflected in accordance with the reflection values assigned to the set of surface regions in the simulation environment; and
testing a perception algorithm on the reflection data.

11. The method of claim 10, wherein testing the perception algorithm further comprises:
placing a virtual vehicle within the simulation environment, coupled to the virtual sensor and operable to travel a path through the simulation environment; and
sending control signals output by the perception algorithm to the virtual vehicle.

12. The method of claim 9, further comprising:
assembling a set of surface regions from the set of modeling data to form a virtual object;
the step of assigning the reflection values further comprises:
placing the virtual object within a virtual environment;
collecting reflection data from transmissions from a virtual sensor placed within the virtual environment, as reflected in accordance with the reflection values assigned to the set of surface regions in the simulation environment; and
testing a perception algorithm on the reflection data.

13. The method of claim 9, further comprising tagging portions of at least one of the set of training data and the set of modeling data, which portions correspond to regions in at least one environment from which the at least one of the set of training data and the set of modeling data is collected, and which regions are correlated with ranges of the reflection values.

14. The method of claim 9, further comprising collecting the set of training data, which further comprises:
collecting a training set of modeling data for a set of target areas;
collecting a training set of reflection data from the set of target areas correlated with the training set of modeling data;
identifying aspects of the set of target areas in the training data with a set of labels for supervised learning with the set of training data.

15. A system for modeling reflections, comprising:
a processor set configured to process a set of virtual-environment data, which is captured by at least one of a camera system, a Light-Detection-And-Ranging (LIDAR) system, and a locational-awareness system, sufficient to generate a three-dimensional model of a virtual environment;
a mapping module which, when executed by the processer set, creates a reflection model for the virtual environment by applying the virtual-environment data to a probability distribution function to assign, using a mapping function, reflection values to surfaces within the three-dimensional model of the virtual environment for reflectivity of each of the surfaces, for at least one of a virtual radar system and a virtual ultrasonic system; and
a test bench operable to evaluate a reflection-processing algorithm with simulated reflection data obtained from a virtual sensor engaging reflection values assigned to surfaces of the three-dimensional model encountered by the virtual sensor traveling within the virtual environment.

16. The system of claim 15, further comprising a machine learning module which, when executed by the processor set, generates the probability distribution function from training data comprising labeled modeling data correlated with reflection data from at least one of a radar system and an ultrasonic system.

17. The system of claim 16, further comprising a heuristic model which, when executed by the processor set, provides information to the machine learning module about a location relative to an overall field of view of a sensor, used in capturing the training data, from which a portion of the training data originates.

* * * * *